(12) United States Patent
Kim et al.

(10) Patent No.: US 12,346,496 B2
(45) Date of Patent: Jul. 1, 2025

(54) ADAPTIVE BLURRING OF VIRTUAL CONTENT

(71) Applicant: Apple Inc., Cupertino, CA (US)

(72) Inventors: Nahckjoon Kim, Sunnyvale, CA (US); Anshu K. Chimalamarri, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/437,191

(22) Filed: Feb. 8, 2024

(65) Prior Publication Data

US 2025/0110550 A1   Apr. 3, 2025

Related U.S. Application Data

(60) Provisional application No. 63/541,758, filed on Sep. 29, 2023.

(51) Int. Cl.
| | |
|---|---|
| *G06F 3/01* | (2006.01) |
| *G06T 7/90* | (2017.01) |
| *G06T 19/20* | (2011.01) |

(52) U.S. Cl.
CPC .............. *G06F 3/013* (2013.01); *G06T 7/90* (2017.01); *G06T 19/20* (2013.01); *G06T 2207/10024* (2013.01); *G06T 2219/2012* (2013.01)

(58) Field of Classification Search
CPC . G06F 3/013; G06T 7/90; G06T 19/20; G06T 2207/10024; G06T 2219/2012
See application file for complete search history.

(56) References Cited

U.S. PATENT DOCUMENTS

| | | | | |
|---|---|---|---|---|
| 2021/0271321 | A1* | 9/2021 | Zhou | G06V 40/00 |
| 2021/0358216 | A1* | 11/2021 | LaFayette | G06F 3/013 |
| 2022/0222858 | A1* | 7/2022 | Almog | H04N 19/136 |
| 2023/0210364 | A1* | 7/2023 | Kawakami | G06F 3/013 |
| | | | | 345/156 |
| 2024/0196065 | A1* | 6/2024 | Hamada | H04N 21/4728 |

* cited by examiner

*Primary Examiner* — Temesghen Ghebretinsae
*Assistant Examiner* — Ivelisse Martinez Quiles
(74) *Attorney, Agent, or Firm* — BAKERHOSTETLER

(57) ABSTRACT

An MR device may determine whether to perform an operation to blur on the virtual content. A pixel may be sampled, as well several pixels with a vicinity, or predetermined distance, from the sampled pixel. When a threshold number of pixels is used to present the virtual content, a blur operation is performed on the pixels, thus blurring the virtual content, which may cause the virtual content to be at least partially presented as a low-resolution image. Alternatively, when the threshold number of pixels is not used to present the virtual content, the blur operation is not performed, thus minimizing computational processes associated with presenting the virtual content.

20 Claims, 8 Drawing Sheets

ADAPTIVE BLURRING OF VIRTUAL CONTENT

CROSS-REFERENCE TO RELATED APPLICATION(S)

This application claims the benefit of U.S. Provisional Application No. 63/541,758, entitled "ADAPTIVE BLURRING OF VIRTUAL CONTENT," filed Sep. 29, 2023, the entirety of which is incorporated herein by reference.

TECHNICAL FIELD

This application is directed to electronic devices that present virtual content on displays, and more particularly, to mixed reality (MR) devices that perform a blur operation on virtual content.

BACKGROUND

Some electronic devices present virtual content on one or more displays of an MR device. The virtual content may include multiple virtual objects. In some instances, a user viewing the one or more displays is focused on one virtual object and not focused on another virtual object(s). However, each of the virtual objects may be rendered in focus, and the virtual object(s) not being focused on by the user may nonetheless draw the user's attention.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
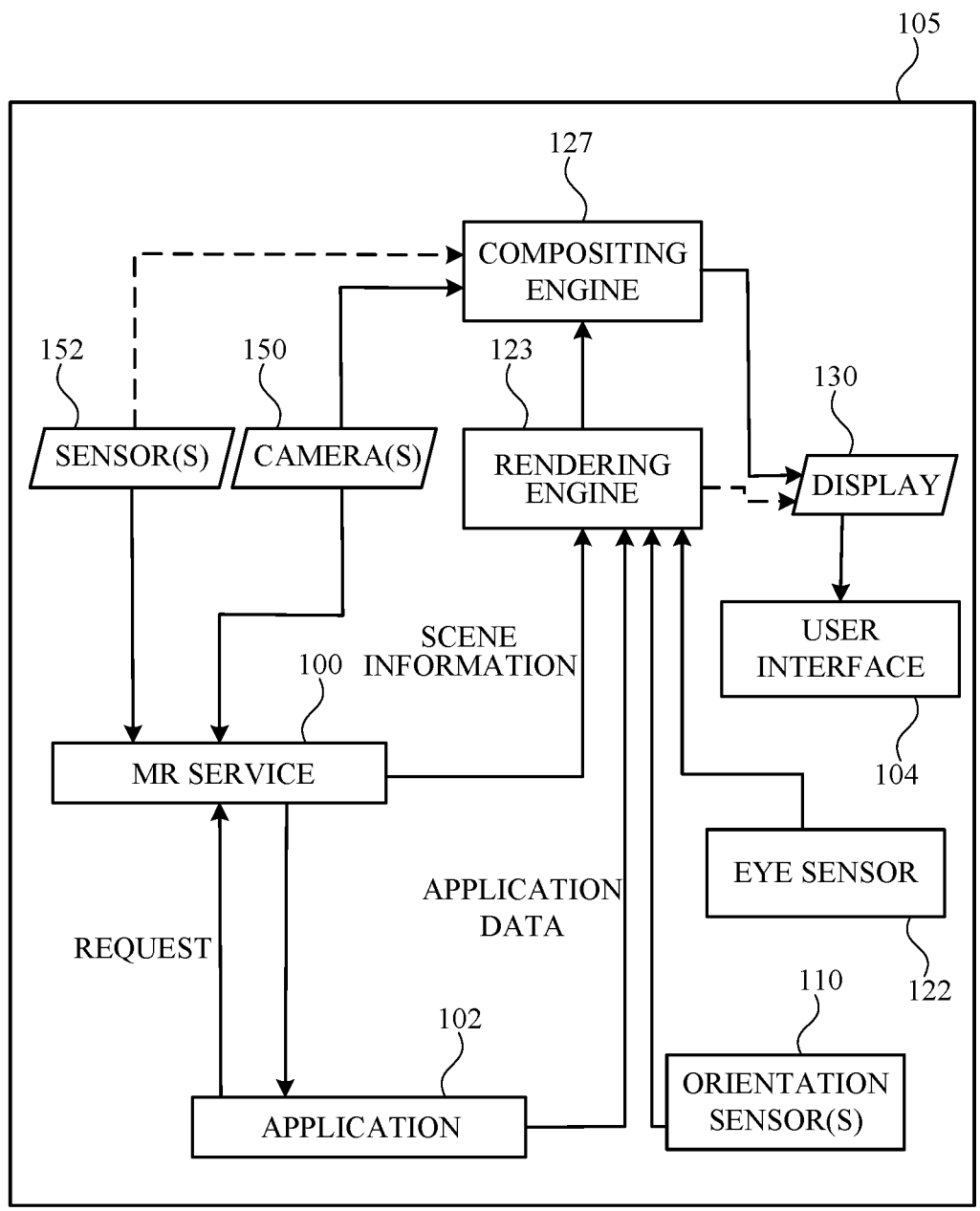
FIG. 1 illustrates an example system architecture of an electronic device implementing the subject technology, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

This disclosure is directed to MR devices blurring virtual content, in the form of one or more virtual objects. In particular, this disclosure is directed to adaptively determining whether to perform a blur operation (e.g., blur algorithm) based on whether one or more threshold criteria are satisfied. For example, a heuristic approach may be used to determine whether the virtual content should be blurred. This may include sampling a pixel, and further sampling pixels within a predetermined distance of (e.g., a vicinity of, proximate to) of the pixel. In one or more implementations, the (initially) sampled pixel may be used in part to present the virtual content. Further, a determination is made as to whether the sampled pixels are densely populated enough with active pixels (e.g., pixels currently used to present the virtual content). For example, when a threshold number of pixels is used to present the virtual content, the MR device may perform a subsequent operation to blur the sampled pixels, which causes at least a partial blurring of the virtual content. By blurring the virtual content, the image detail of the virtual content may be reduced, and the blurred virtual content may attract less attention from the user, causing the user's focus on the blurred virtual content to diminish. Beneficially, the user may experience less eye strain by reducing focus on the blurred virtual content.

Conversely, the MR device may use the heuristic approach to reject the blur operation. For example, when the threshold number of pixels is not currently used to generate the virtual content, the MR device may forgo the blur operation to blur the virtual content. MR devices described herein may perform this heuristic approach several times by, for each instance, sampling a pixel and selecting one or more pixels within a predetermined distanced from the sampled pixel. Moreover, the initially sampled pixels may or may not be used to present the virtual content. In this regard, the MR device can selectively perform a blur operation by blurring some regions of the virtual content and ignoring (e.g., not blurring) other regions of the virtual content. Beneficially, using a selective blurring approach operation may conserve computing resources by limiting the blur operation to instances when the threshold is satisfied.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 illustrates an example system architecture of an electronic device 105 implementing the subject system, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 105 may be smart phone, a tablet device, or a wearable device such as a head mountable portable system, which includes a display system capable of presenting a visualization of an MR environment to a user. The electronic device 105 may be powered with a battery and/or any other power supply. In an example, the electronic device 105 includes a display 130 that provides a stereoscopic presentation of an MR environment, enabling a three-dimensional visual display of a rendering of a particular scene, to the user.

The electronic device 105 may include one or more cameras 150 (e.g., visible light cameras, infrared cameras, etc.). Further, the electronic device 105 may include one or more sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

For explanatory purposes, portions of the architecture of FIG. 1 are described as being implemented by the electronic device 105 of FIG. 1, such as by a processor and/or memory of the electronic device. Various portions of the architecture of FIG. 1 can be implemented in software or hardware, including by one or more processors and a memory device containing instructions, which when executed by the processor cause the processor to perform the operations described herein. For example, in FIG. 1, the trapezoidal boxes may indicate that the sensors 152, the one or more cameras 150 and the display 130 may be hardware components, and the rectangular boxes may indicate that the MR service 100, the application 102, the rendering engine 123, and the compositing engine 127 (e.g., compositor) may be implemented in software, including by one or more processors and a memory device containing instructions, which when executed by the processor cause the processor to perform the operations described herein.

In the example of FIG. 1, the application 102 may provide application data to a rendering engine 123 for rendering of the application data, such as for rendering of the UI of the application. The application 102 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, the rendering engine 123 renders the UI 104 for display by a display such as the display 130 of the electronic device 105. In one or more implementations, the MR service 100 may assign a portion of a physical environment of the electronic device to the application 102 (e.g., while the application 102 is running on the electronic device 105 and while the UI 104 is displayed by the display 130.

As shown in FIG. 1, additional information may be provided for display of the UI of the application 102, such as in a two-dimensional or three-dimensional (e.g., MR) scene. In the example of FIG. 1, the one or more sensors 152 may provide physical environment information (e.g., depth information from one or more depth sensors, motion information from one or more motion sensors), and/or user information to an MR service 100. The one or more cameras 150 may also provide images of a physical environment and/or one or more portions of the user (e.g., the user's eyes, hands, face, etc.) to the MR service 100. The MR service 100 may generate scene information, such as a three-dimensional map, of some or all of the physical environment of electronic device 105 using the environment information (e.g., the depth information and/or the images) from the one or more sensors 152 and the one or more cameras 150. The MR service 100 may also determine a gaze location based on images and/or other sensor data representing the position and/or orientation of the user's eye(s). The MR service 100 may also identify a gesture (e.g., a hand gesture) performed by a user of the electronic device 105, based on images and/or other sensor data representing the position and/or orientation of the user's hand(s) and/or arm(s).

As illustrated in FIG. 1, in one or more implementations, the application 102 may provide a request to the MR service 100. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

The application 102 may include code that, when executed by one or more processors of electronic device 105, generates application data, for display of the UI 104 on, near, attached to, or otherwise associated with an anchor location corresponding to the anchor identified by the identifier provided from MR service 100. The application 102 may include code that, when executed by one or more processors of the electronic device 105, modifies and/or updates the application data based on user information (e.g., a gaze location and/or a gesture input) provided by the MR service 100.

Once the application data has been generated, the application data can be provided to the MR service 100 and/or the rendering engine 123, as illustrated in FIG. 1. As shown, scene information can also be provided to rendering engine 123. The scene information provided from the MR service 100 to the rendering engine 123 can include or be based on, as examples, environment information such as a depth map of the physical environment, and/or object information for detected objects in the physical environment. The rendering engine 123 can then render the application data from the application 102 for display by the display 130 of electronic device 105 to appear at a desired location in a physical environment. For example, a representation of the UI 104 may be rendered for display at the appropriate location on the display 130, to appear to be located at a desired location in the physical environment, using the application data and using the scene information from the MR service 100 (which may include scene information for other portions of the physical environment).

In one or more implementations, the display 130 may be, for example, an opaque display, and the one or more cameras 150 may be configured to provide a pass-through video feed to the opaque display. The UI 104 may be rendered for display at a location on the display corresponding to the displayed location of a physical anchor object in the pass-through video. The display 130 may be, as another example, a transparent or translucent display. The UI 104 may be rendered for display at a location on the display corresponding to a direct view, through the transparent or translucent display, of the physical environment.

As shown, in one or more implementations, the electronic device 105 may further include a compositing engine 127 that composites video images of the physical environment, based on images from one or more cameras 150, for display together with the UI 104 from the rendering engine 123. For example, the compositing engine 127 may be provided in the electronic device 105 and when the display 130 includes an opaque display, the compositing engine 127 may provide pass-through video to the display. In several examples shown and described herein, the compositing engine 127 may modify the virtual depth a virtual object by adjusting the disparity between the virtual object displayed to each eye of a user of the electronic device 105, such as in a stereoscopic display mode. In one or more implementations, this may include adjusting the disparity to adjust the virtual depth of one virtual object relative to another virtual object.

Although the example of FIG. 1 illustrates the rendering engine 123 as being separate from the MR service 100, it should be appreciated that the MR service 100 and the rendering engine 123 may form a common service and/or that rendering operations for rendering content for display can be performed by the MR service 100. Although the example of FIG. 1 illustrates the rendering engine 123 as being separate from application 102, it should be appreciated that, in some implementations, the application 102 may render content for display by the display 130 without using a separate rendering engine. Although the application 102 is depicted as a single application in FIG. 1, it is appreciated that the application 102 may represent multiple applications running concurrently on the electronic device 105 and generating application data for rendering of respective UIs for display by display 130. In one or more implementations, the compositing engine 127 may composite application data for multiple UIs of multiple applications for concurrent display.

The electronic device 105 may include one or more orientation sensors 110 for detecting orientation and/or movement of the electronic device 105 and/or the one or more displays 130. For example, the electronic device 105 may use the one or more orientation sensors 110 to track changes in the position and/or orientation of the electronic device 105 and/or the one or more displays 130, such as with respect to physical elements in the physical setting. The one or more orientation sensors 110 optionally include one or more gyroscopes and/or one or more accelerometers. Additionally, the electronic device 105 may further include an eye sensor 122 that track the gaze location of each of the user's eyes and/or the location at which the gaze directions of the user's eye converge (e.g., at a gaze plane).

Figure 2A:
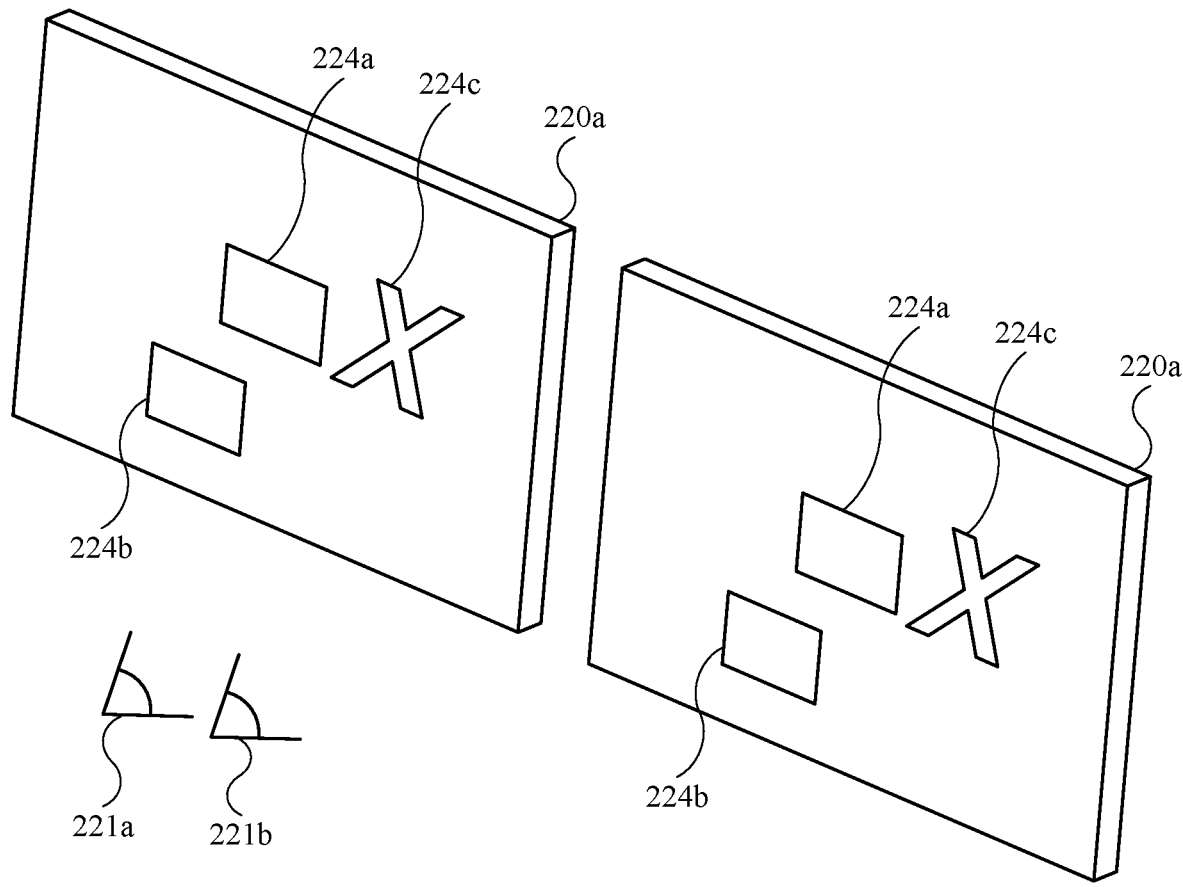
FIG. 2A illustrates a perspective view of an example of displays of an electronic device presenting virtual content, in accordance with aspects of the present disclosure.

FIG. 2A illustrates a perspective view of an example of displays of an electronic device presenting virtual content, in accordance with aspects of the present disclosure. As shown, a display 220a and a display 220b present a virtual content to a left eye 221a and a right eye 221b, respectively, of a user. The displays 220a and 220b may include any features and functions described for the display 130 (shown in FIG. 1). In one or more implementations, the displays 220a and 220b are integrated with an electronic device (e.g., MR device) in which a user views content (e.g., virtual content, real world content, or a combination thereof) on the displays 220a and 220b. However, in one or more implementations, the displays 220a and 220b are integrated with another electronic device (e.g., AR device, see-through system), in which the user may see at least some real world objects through a lens, and each of the displays 220a and 220b projects virtual content onto the lens, thus presenting the virtual content in conjunction with the real world objects.

Each of the displays 220a and 220b may present content, such as a virtual object 224a, a virtual object 224b, and a virtual object 224b. The virtual objects 224a and 224b may take the form of a rectangle, as a non-limiting exemplary object. Further, the virtual object 224c may take the form of a letter (e.g., X), as a non-limiting virtual object. In one or more implementations, the virtual objects 224a, 224b, and 224c may be presented differently, in terms of position, by the displays 220a and 220b to account for a disparity (e.g., binocular disparity) between the left eye 221a and right eye 221b of a user. Also, the virtual objects 224a, 224b, and 224c may be generated by a rendering engine (e.g., rendering engine 123 shown in FIG. 1) and/or by a compositor (e.g., compositing engine 127 shown in FIG. 1).

Figure 2B:
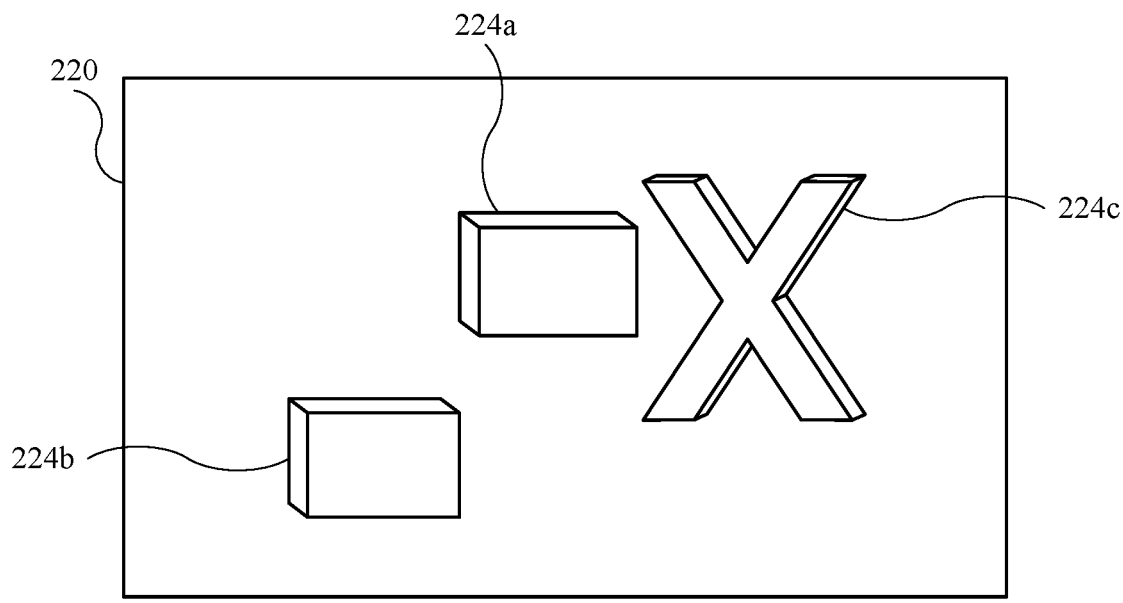
FIG. 2B illustrates a plan view showing the virtual content from the displays shown in FIG. 2A in stereoscopic display mode, in accordance with aspects of the present disclosure.

FIG. 2B illustrates a plan view showing the virtual content from the displays 220a and 220b shown in FIG. 2A in a stereoscopic display mode, in accordance with aspects of the present disclosure. As shown, a representation 220 combines the displays 220a and 220b (shown in FIG. 2A) to present as a three-dimensional representation of the virtual objects 224a, 224b, and 224c, as perceived by a user. For example, each of the virtual objects 224a and 224b may take the form of a cuboid (e.g., three-dimensional rectangle) and the virtual object 224c may take the form of a three-dimensional letter (e.g., three-dimensional X). Accordingly, based on the stereoscopic display mode, virtual content rendered on the displays 220a and 220b may be perceived by a user as having depth.

Figure 3:
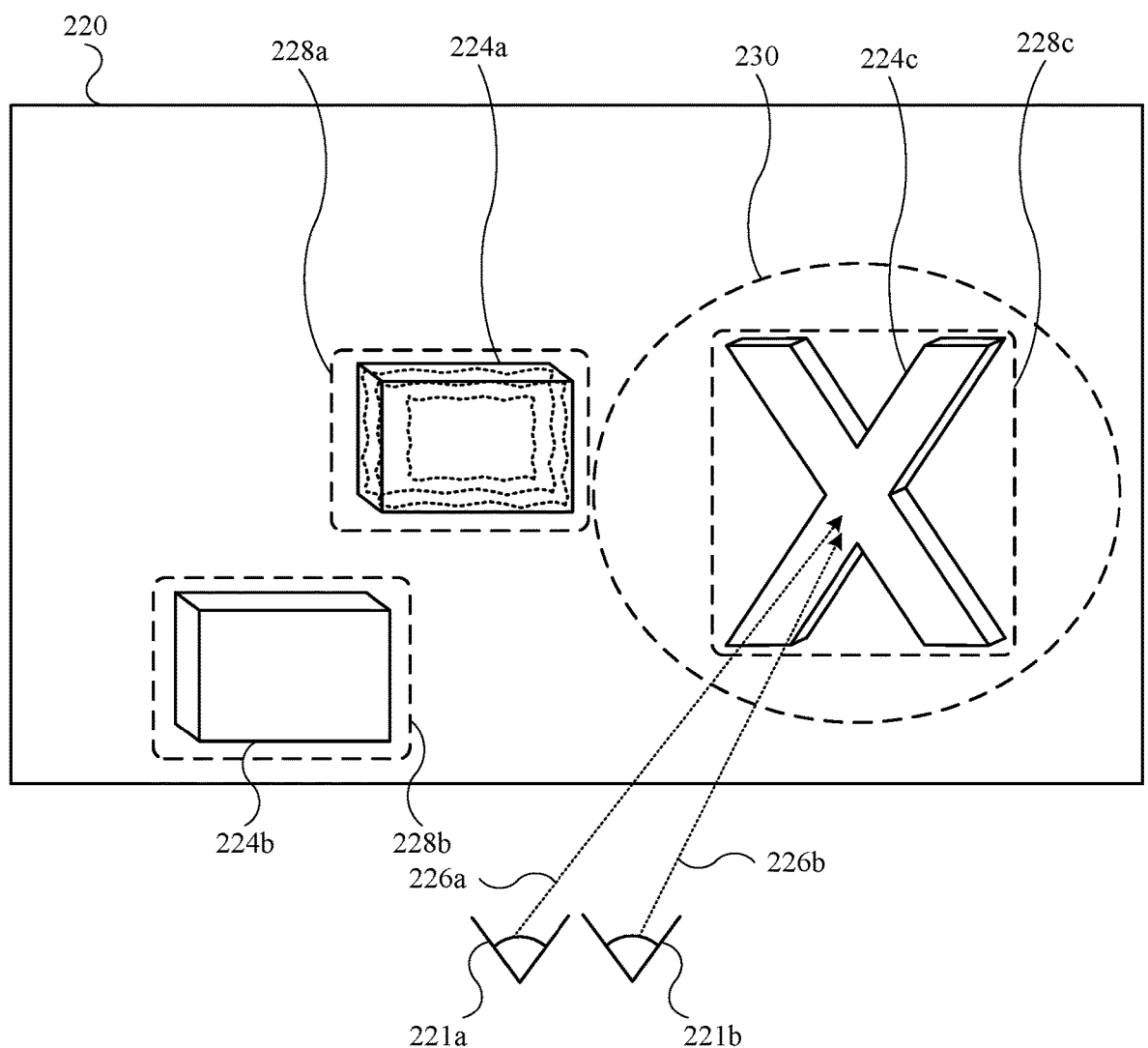
FIG. 3 illustrates a plan view showing the virtual content in a stereoscopic display mode, further showing a virtual object after undergoing a blur operation, in accordance with aspects of the present disclosure.

FIG. 3 illustrates a plan view showing the representation 220 of the virtual content in a stereoscopic display mode, further showing the virtual object 224a after undergoing a blur operation, in accordance with aspects of the present disclosure. As a result of the blur operation (represented by several dotted lines), the virtual object 224a may be perceived by a user as being blurred. In this regard, the virtual object 224a, when blurred, may be perceived by the user as a low-resolution image.

MR devices described herein may apply a heuristic approach to determine whether to perform a blur operation to virtual content. For example, an MR device may sample a pixel. In some instances, the virtual object 224a may include the sampled pixel. However, an MR device can generally sample any pixel, including a pixel that that may or may not be used to present virtual content. Subsequent to sampling the pixel, several pixels within a predetermined distance from the initially sampled pixel are also sampled. The MR device can determine whether a threshold number of pixels (from the sampled pixels) are used to present virtual content. For example, from a sampled set of pixels, the MR device can determine whether a threshold number of pixels are used to present the virtual content (that may or may not be part of the virtual object 224*a*). Further, when at least the threshold number of sampled pixels are used to present the virtual content, the MR device can perform a blur operation to the virtual content. As shown in FIG. 3, this may include performing a blur operation on the sampled pixels, at least some of which are included in the virtual object 224*a*. Further, the blur operation may apply different blurring effects to different regions of virtual content based in part on the makeup (e.g., color, appearance) of the sampled pixels.

Conversely, when a number less than the threshold number of sampled pixels are used to present the virtual content, the MR device can forgo the blur operation to the virtual object content. This may occur, for example, at the edges or boundaries of the virtual content, where at least some pixels may not be used to present the virtual content. Regarding the virtual object 224*a*, for a sampled set of pixels in which fewer than the threshold number of sampled pixels are included in the virtual object 224*a*, the MR device can forgo the blur operation. Accordingly, the sampling operation may be relied upon by an MR device to not perform an operation (e.g., blur operation), thus saving the computational steps associated with the blur operation. Beneficially, the selective approach with respect to performing the blur operation may increase processing efficiency in MR devices, as the sampling operation may require less computational operations as comparing to the blur operation. Such benefits may be particularly helpful in devices utilizing see-through displays, where the proportion of a user's field of view occupied by virtual content may be relatively small so as not to overly obscure the user's view of the surrounding real environment.

In one or more implementations, MR devices described herein may determine which virtual content is currently being viewed by a user as well as which virtual content is not currently being viewed by a user. For example, an MR device may include one or more sensors (e.g., one or more cameras 150 shown in FIG. 1) that track movement of the left eye 221*a* and the right eye 221*b* of the user, and determine gaze tracking information of the left eye 221*a* and the right eye 221*b* based on the one or more sensors. The gaze information may generate a gaze vector 226*a* and a gaze vector 226*b* for the left eye 221*a* and the right eye 221*b*, respectively. As shown, the gaze vectors 226*a* and 226*b* are converging near the virtual object 224*c*, indicating the user is currently viewing the virtual object 224*c*.

MR devices described herein may use other approaches to determine which virtual object(s) is/are being viewed by a user by applying bounding boxes to the virtual content. For example, a bounding box 228*a*, a bounding box 228*b*, and a bounding box 228*c* are applied to (e.g., surrounds) and used to identify the virtual object 224*a*, the virtual object 224*b*, and the virtual object 224*c*, respectively. Based on an application (e.g., software application) running on the MR device that is used to generate the virtual objects 224*a*, 224*b*, and 224*c*, the bounding boxes 228*a*, 228*b*, and 228*c* may provide an indication that the user (e.g., the left eye 221*a* and the right eye 221*b*) is viewing the virtual object 224*c*. For example, the application may cause the user to focus on the virtual object 224*c*. The bounding boxes may be used alternatively to or additionally with the gaze tracking information.

Further, a field of view 230 (represented by an exemplary ellipse) is shown. The field of view 230 may encompass more than the virtual object 224*c* and may provide a general viewing area, or gaze region, of the user. The field of view 230 may provide MR devices described herein at least some indication as to whether virtual content (e.g., virtual object 224*c*) are in focus or not in focus by the user. The gaze vectors 226*a* and 226*b* may provide confirmation on which content the user is or is not focusing. When virtual objects are not in focus by a user, MR devices described herein may apply a blur operation on virtual content. For example, the virtual object 224*a* is external to (e.g., not within) the field of view 230. However, the virtual object 224*a* is relatively close to the field of view 230, indicating the virtual object 224*a* may be near a peripheral view of the user. As a result, an MR device may determine the virtual object 224*a* draws user's attention away from the virtual object 224*c*. By performing a blur operation to blur the virtual object 224*a*, as shown in FIG. 3, the user may perceive the virtual object 224*a* as being out of focus.

Conversely, MR devices described herein may adaptively forgo performing the blur operation on other virtual content. For example, a blur operation may not be performed on the virtual object 224*b*, as the virtual object 224*b* may be deemed far enough from the virtual object 224*c* so as to not draw the user's attention away from the virtual object 224*c*. However, in one or more implementations, an alternative blur operation is performed on the virtual object 224*b*, which may require less computational processes, as compared to those of the blur operation performed on the virtual object 224*a*, but nonetheless reduce the resolution of the virtual object 224*b*. For example, a filter may be applied to the virtual object 224*b* that provides a partial reduction of resolution of the virtual object 224*b*.

As yet another example for determining which virtual content is in a field of view of a user, MR devices described herein may separate a scene with virtual content into different layers. For example, a scene may include a set of one or more virtual objects assigned to a foreground layer. Further, the scene may include another set of one or more virtual objects assigned to a background layer. The one or more virtual objects in the foreground layer may include a virtual object(s) within a field of view the user, at least some of which is focused on or viewed by a user a MR device. The one or more virtual objects in the background layer may be subject to a blur operation. In order to determine and assign virtual objects to a foreground layer or a background layer, an application running on an MR device may include instructions to present the virtual objects 224*a*, 224*b*, and 224*c*. In one or more implementations, it may be desired by the application that the user focus on particular virtual content (e.g., the virtual object 224*c*), which may place the virtual content in the foreground layer. As a result, other virtual content (e.g., virtual objects 224*a* and 224*b*) may be placed in the background layer, which may subject the virtual content (in the background layer) to a blur operation.

Figure 4:
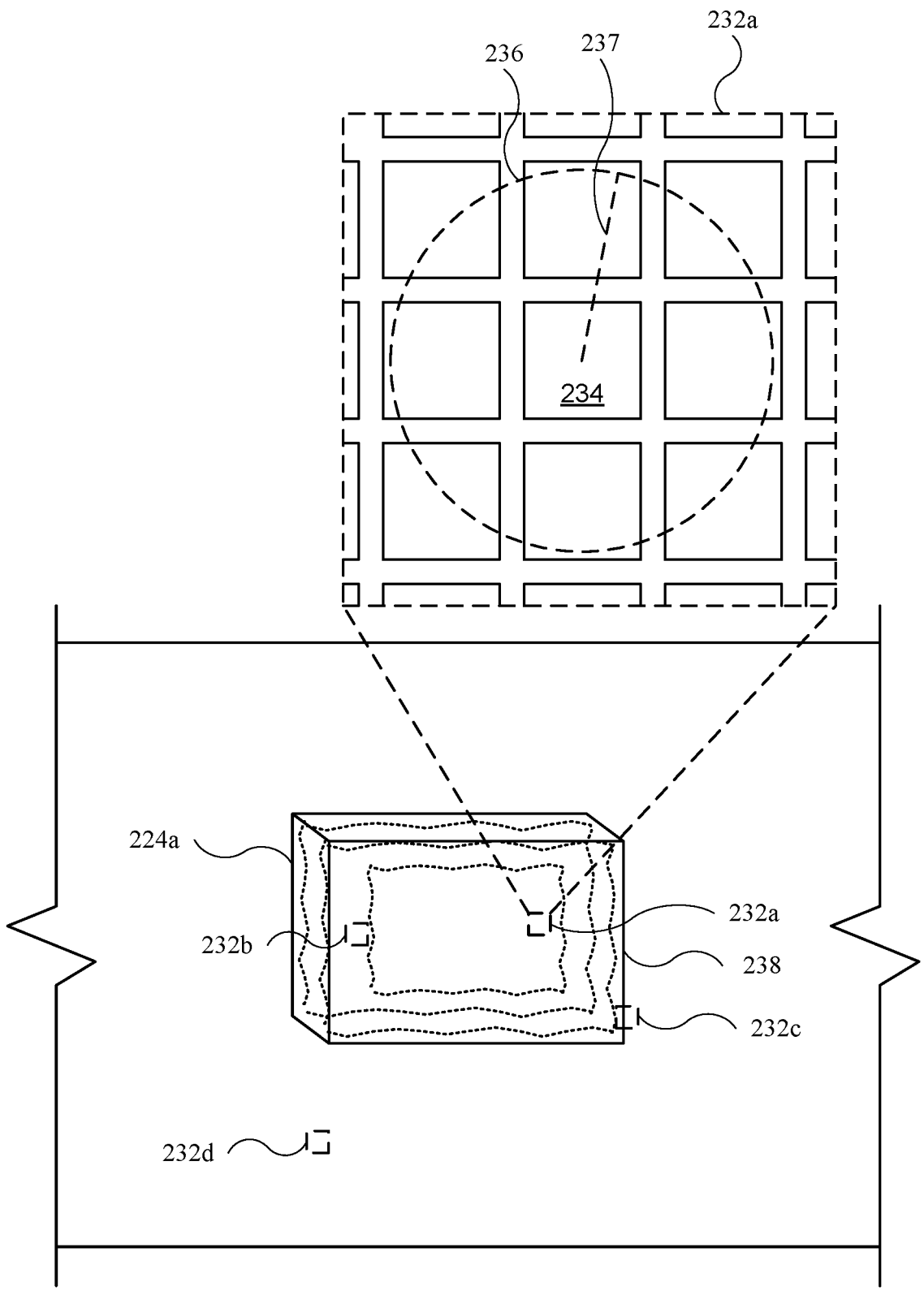
FIG. 4 illustrates a perspective view of virtual content, showing several sampled regions of the virtual content, in accordance with aspects of the present disclosure.

FIG. 4 illustrates a perspective view of virtual content, showing several sampled regions of the virtual content, in accordance with aspects of the present disclosure. As shown, a region 232*a*, a region 232*b*, and a region 232*c* of the virtual object 224*a* is selected for sampling. As shown in the enlarged view, the region 232*a* of the virtual object 224*a* includes several pixels used to present the virtual object 224*a*. Using a heuristic approach, an MR device described herein may determine whether to perform a blur operation to virtual content associated with the virtual object 224*a*. For example, an MR device may sample a pixel 234 from the region 232*a*. Further, an MR device can subsequently sample several pixels within a predetermined distance from the pixel 234 (e.g., the initially sampled pixel). As shown, a boundary 236, defined by a circle with a radius 237, surrounds the pixel 234 and may be used to determine the additionally sampled pixels (shown, not labeled) within the predetermined distance. For example, pixels at or within the boundary 236 may be determined to be proximate to the pixel 234 and used in the sample. While a discrete number of pixels (e.g., eight pixels) are shown within the predetermined distance from the pixel 234, the number of pixels within the predetermined distance may vary based upon the size and/or shape of the boundary 236. Alternatively, the predetermined distance may include any pixels that are adjacent to (e.g. no intervening pixels between) the pixel 234.

Using the sampled pixels, the MR device may perform an operation to determine whether a threshold amount of the virtual object 224a, from the sampled pixels, is used to present the virtual content. For example, if a threshold number (e.g., 50% or more, 75% or more) of sampled pixels is used to present the virtual object 224a, the MR device may perform a subsequent operation to blur the virtual object 224a. Examples of blurring may include an image-blurring filter in which a transformation is applied to each sampled pixel. In one or implementations, the operation includes a Gaussian blur in which a Gaussian function is used to transform the sampled pixels.

Further, in one or more implementations, a representative color from respective colors of each sampled pixels is determined, and the blur operation transforms each of the sampled pixels to the representative color, or at least substantially transforms (e.g., two or more of the sampled pixels, a majority of the sampled pixels) each of the sampled pixels to the representative color. For example, a red, green, blue (RGB) model may be used to encode red, green, and blue light levels for each pixel as a number. In this regard, each sampled pixel may include three encoded numbers, corresponding to the red, green, and blue levels of the pixel. When the respective encoded numbers for each sampled pixels are obtained, the respective colors of each sampled pixel may be obtained. Further, by determining the average of each of the three encoded numbers, a representative color corresponding to the three average numbers may be determined. Thus, an average of the red, green, and blue light levels of the sampled pixels may be determined, and used as the representative color (corresponding to the average values). An MR device can use the representative color to perform a blur operation by causing each sampled pixel to transform to the representative color.

MR devices described herein may repeat the sampling operation on additional regions of the virtual object 224a and determine whether to perform a blur operation on the additional regions. The sampling process described for the region 232a may be applied to subsequent regions. For example, the region 232b represents a different sampled region. The MR device may sample a pixel within the region 232b, as well as a number of pixels within a predetermined distance from the sampled pixel. When a threshold number of sampled pixels within the region 232b is used to present the virtual object 224b, a blur operation may be applied to the sampled pixels. However, the blur operation may result in a different appearance of the sampled pixels in the region 232b as compared to the result of the sampled pixels in the region 232a. For example, when an appearance (e.g., color, brightness, or the like) of the sampled pixels in the regions 232a and 232b are different, the respective blur operations may result in different transformations of the pixels in the regions 232a and 232b.

MR devices described herein may sample additional regions, with at least some of the sampled pixels being inactive (e.g., not being used to present the virtual object 224a). For example, a region 232c of the virtual object 224a may include a sampled pixel that is used to present the virtual object 224a. However, additionally sampled pixels within a predetermined distance from the selected sampled pixels are not used to present the virtual object 224b. As a result, the sample does not include a threshold number of pixels, and an MR device may reject and forgo the blur operation to the sampled pixels in the region 232c.

Moreover, in one or more implementations, edges or peripheral regions of virtual content may be rejected or ignored for a blur operation based on the relative sparseness of rendered virtual content in these locations. For example, the virtual object 224a includes an edge 238, representing an exterior region or perimeter of the virtual object 224a. Based on the edge 238 defining an exterior region of the virtual object 224a, a determination may be made that the number of pixels sampled at or near the edge 238 is below a threshold number of pixels used to present the virtual object 224a. As a result, the blur operation may be rejected, including automatically rejected, at the edge 238 of the virtual object 224a. Additionally, the blur operation may be rejected when the sampled pixels are at or near gaps or spaces of virtual content, representing areas in which there is a void on the virtual content.

Additionally, in one or more implementations, a sampled set of pixels from rendered virtual content does not include any virtual content. For example, a region 232d represented a sample region in which no virtual content is present. Based on the lack any virtual content, an MR device may forgo the blur operation and continue sampling other pixels.

Figure 5:
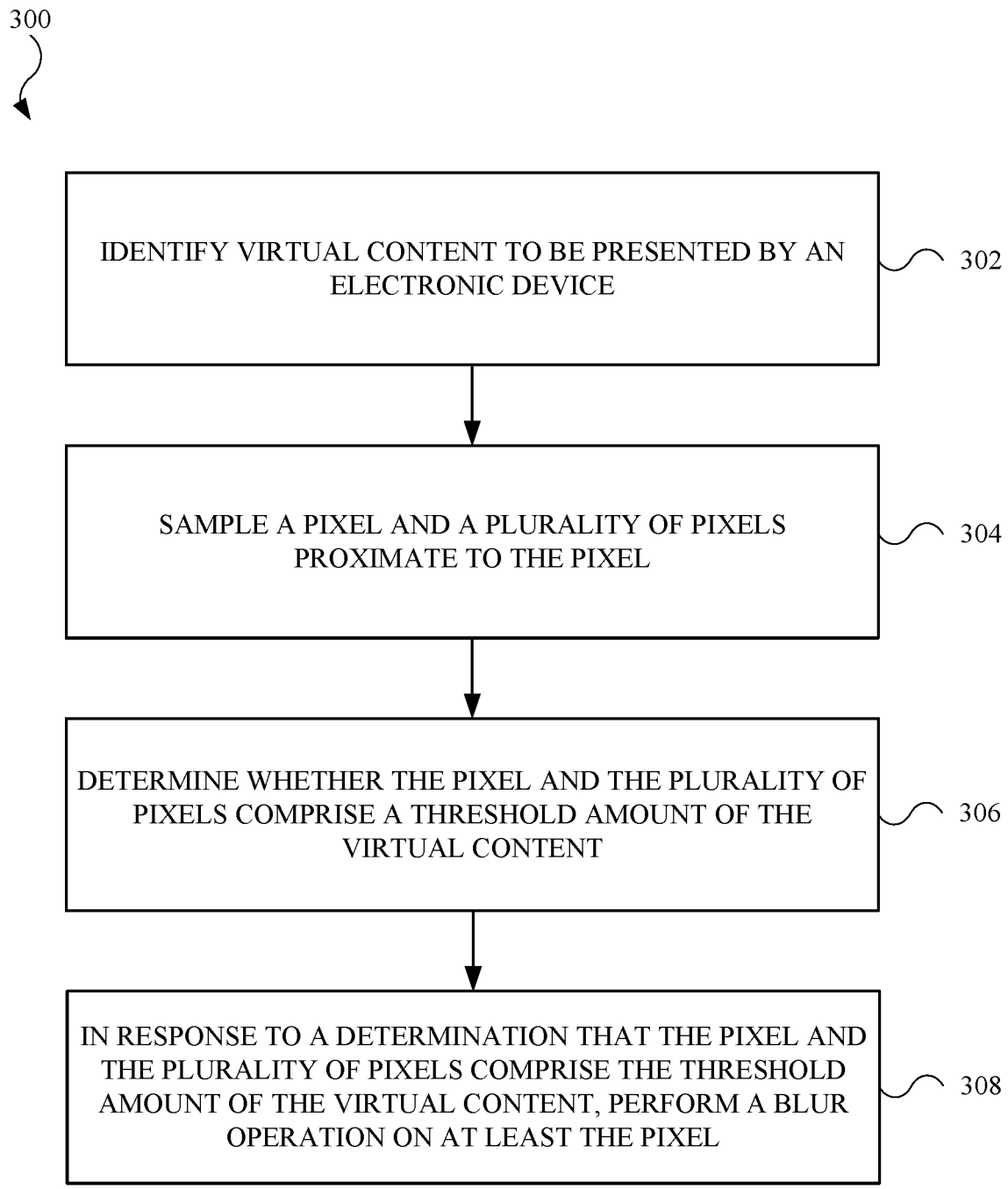
FIG. 5 illustrates a flow diagram showing an example of a process that may be performed for determining whether to blur virtual content, in accordance with implementations of the subject technology.
Figure 6:
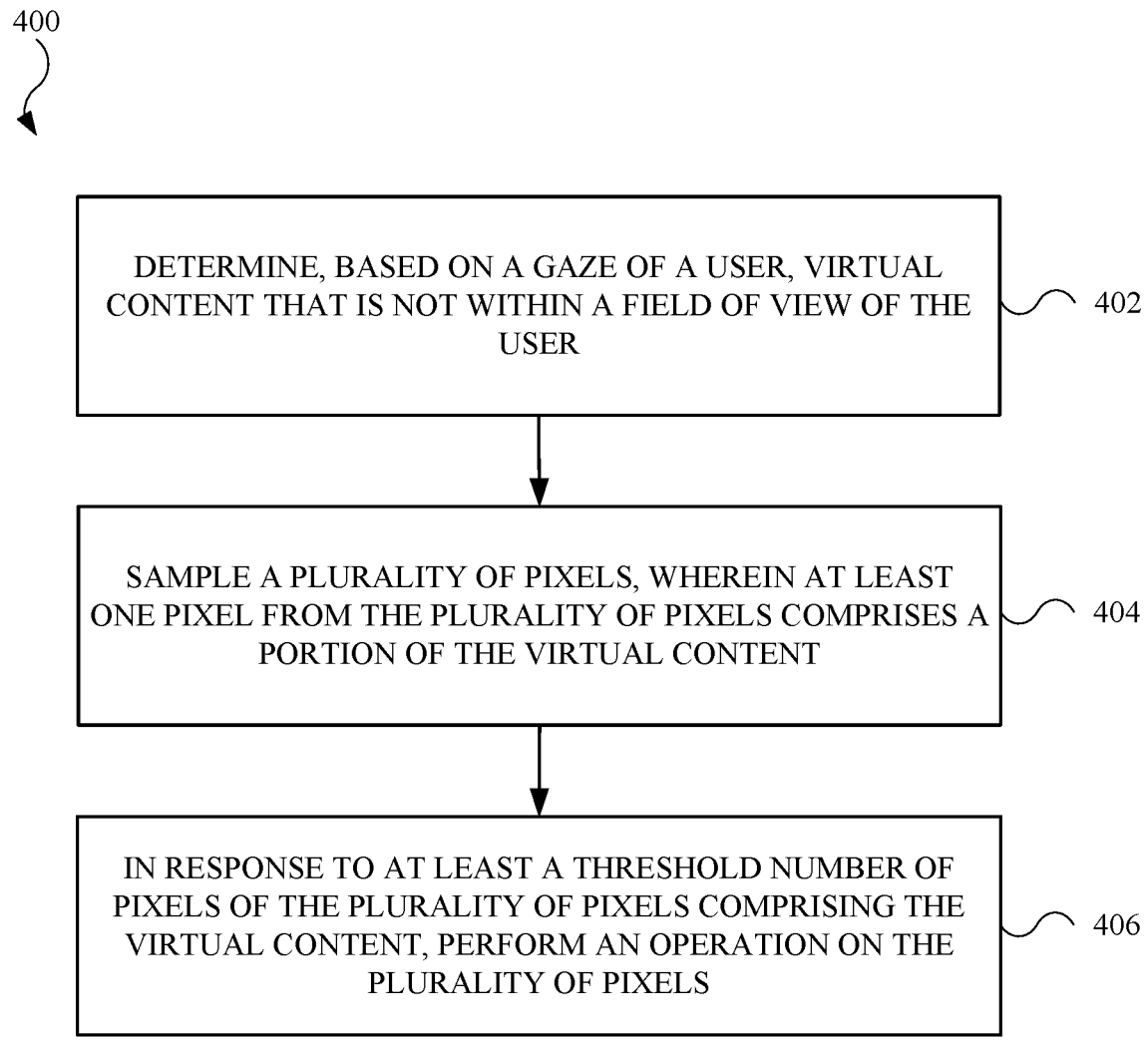
FIG. 6 illustrates a flow diagram showing an alternate example of a process that may be performed for determining whether to blur virtual content, in accordance with implementations of the subject technology.
Figure 7:
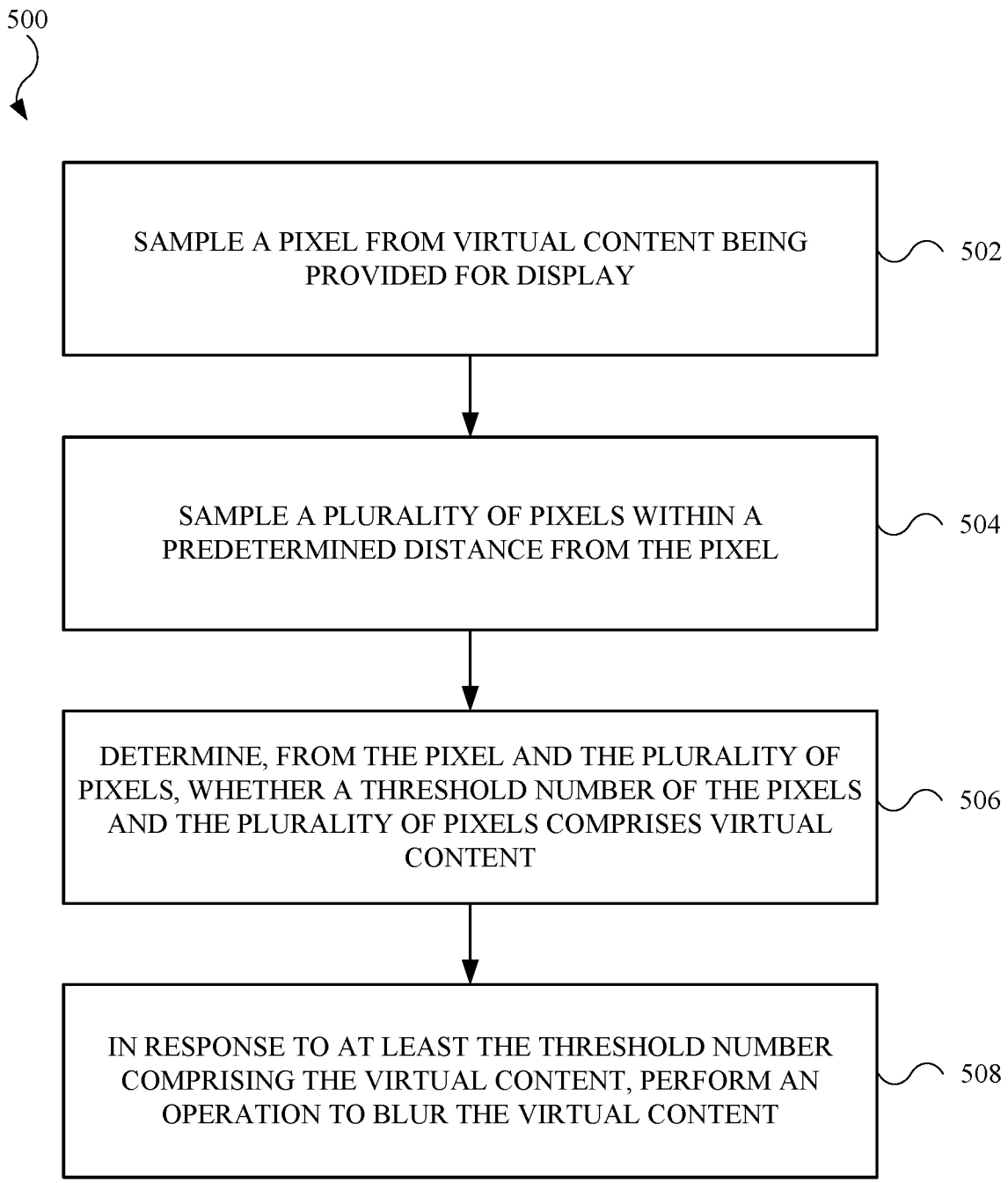
FIG. 7 illustrates a flow diagram showing an additional, alternate example of a process that may be performed for determining whether to blur virtual content, in accordance with implementations of the subject technology.

FIG. 5, FIG. 6, and FIG. 7 illustrate flow diagrams showing examples of a process that may be performed for determining whether to blur virtual content, in accordance with implementations of the subject technology. A rendering engine (e.g., rendering engine 123 shown in FIG. 1), a compositor (e.g., compositing engine 127 shown in FIG. 1), or a combination thereof, may be used in part to conduct one or more steps of the example processes. For explanatory purposes, the respective processes shown in FIGS. 5-7 are primarily described herein with reference to the electronic device 105 (shown in FIG. 1), which may include an MR device. However, the respective processes shown in FIGS. 5-7 are not limited to the electronic device 105, and one or more blocks (or operations) of the respective processes may be performed by one or more other components of other suitable moveable apparatuses, devices, or systems. Further for explanatory purposes, some of the blocks of the respective processes are described herein as occurring in serial, or linearly. However, multiple blocks of the respective processes may occur in parallel. In addition, the blocks of the respective processes need not be performed in the order shown and/or one or more blocks of the respective processes need not be performed and/or can be replaced by other operations.

FIG. 5 illustrates a flow diagram showing an example of a process 300 that may be performed for determining whether to blur virtual content, in accordance with implementations of the subject technology.

At block 302, virtual content to be presented by an electronic device is identified. The virtual content may be presented as an image on respective display of multi-display system, such as an MR device. In this regard, the virtual content may be presented by the electronic device to a user in a stereoscopic display mode using multiple displays, thereby causing the virtual content to appear to have depth (e.g., three-dimensional) to the user. In one or more implementations, gaze tracking information may be obtained and used to determine whether the user is focusing on the virtual content. Additionally, a determination may be made as to whether the virtual content is within a user's field of view, which may to provide an indication as to whether the user is focusing on the virtual content. The gaze tracking information may be used to confirm the indication provided by the field of view. As another example, bounding boxes may be applied to respective virtual objects, and based on the application, the bounding boxes may provide an indication as to whether a user is focusing on a virtual object. As yet another example, a scene presenting a virtual object may assign the virtual object to a foreground layer or background layer, which may provide an indication as to whether the user is focusing on a virtual object.

At block 304, a pixel and a plurality of pixels proximate to the pixel are sampled. In one or more implementations, the pixel is presenting the virtual content. Moreover, the pixel may present, along with one or more other pixels, the virtual content. Alternatively, in one or more implementations, the pixel may be inactive or not presenting the virtual content. Also, for the plurality of pixels to be proximate to, and sampled with, the pixels, the plurality of pixels with the pixel may be a predetermined distance from the pixel. For example, the plurality of pixels may be on or within a circle with a radius extending from the pixel. Alternatively, the predetermined distance may include any pixel(s) adjacent to the (sampled) pixel.

At block 306, a determination is made whether the pixel and the plurality of pixels include a threshold amount of the virtual content. In one or more implementations, the threshold amount includes a minimum number of pixels that are used to present the virtual content. As non-limiting examples, the minimum number may include at least half (e.g., 50%) of the pixels or three-quarters (e.g. 75%) of the pixels.

At block 308, in response to a determination that the pixel and the plurality of pixels comprise the threshold amount of the virtual content, a blur operation is performed on at least the pixel. Moreover, the blur operation may include an image-blurring filter performed on the plurality of pixels in addition to the pixel. The blur operation may include an image-blurring filter (e.g., Gaussian blur) performed on, or applied to, the pixel. In one or more implementations, the image-blurring filter may cause a transformation of each of the pixel and the plurality of pixels. For example, the pixel and the plurality of pixels may transform from their original, respective color, to a single color, and/or variations of a single color, which is representative of the original colors. Also, in one or more implementations, when the threshold number of pixels does not include the virtual content, the blur operation is rejected (e.g., not performed).

FIG. 6 illustrates a flow diagram showing an alternate example of a process 400 that may be performed for determining whether to blur virtual content, in accordance with implementations of the subject technology.

At block 402, based on a gaze of a user, virtual content that is not within a field of view of the user is determined. The virtual object may be presented by an MR device having multiple displays presenting the virtual object in a stereoscopic display mode. The gaze may include gaze information determined by one or more sensors (e.g., eye tracking sensors) of an MR device. When the gaze information indicates the user is focusing on other virtual content (e.g., another virtual object), a determine may be made that the virtual object is not within the field of view of the user.

At block 404, a plurality of pixels is sampled. In one or more implementations, at least one pixel from the plurality of pixels comprises a portion of the virtual content. For example, at least one pixel from the sampled plurality of pixels is used to present the virtual content. Additionally, the plurality of pixels may represent a cluster of pixels in which one pixel is selected for sampling, and the remaining pixels of the plurality of pixels are within a predetermined distance from the sampled pixel.

At block 406, in response to at least a threshold number of pixels of the plurality of pixels comprising the virtual content, an operation is performed on the plurality of pixels. The operation may include a blur operation (e.g., image-blurring filter) to blur the plurality of pixels, thus blurring at least a portion of the virtual content. Also, in one or more implementations, when the threshold number of pixels does not include the virtual content, the operation is rejected (e.g., not performed).

FIG. 7 illustrates a flow diagram showing an additional, alternate example of a process 500 that may be performed for determining whether to blur virtual content, in accordance with implementations of the subject technology.

At block 502, a pixel from virtual content being provided for a display is sampled. The pixel may be used to present, in part, virtual content from an MR device having multiple displays presenting the virtual content in a stereoscopic display mode. Alternatively, the pixel may not be used to present the virtual content. In one or more implementations, the virtual content is not within a field of view of a user viewing a display that presents the virtual object.

At block 504, a plurality of pixels within a predetermined distance from the pixel is sampled. The predetermined distance from the sampled pixel may be defined as a circle with a radius extending from the sampled pixel. Alternatively, the predetermined distance may include a pixel(s) adjacent to the sampled pixel.

At block 506, a determination is made, from the pixel and the plurality of pixels, whether a threshold number of the pixels and the plurality of pixels includes virtual content. The threshold number of pixels include a minimum number of pixels used to present the virtual content.

At block 508, in response to at least the threshold number including the virtual content, an operation is performed to blur the virtual content. The operation may include providing a filter to the virtual object to blur the virtual object. The operation may include a blur operation (e.g., image-blurring filter) to blur the pixel and the plurality of pixels, thus blurring at least a portion of the virtual content. Also, in one or more implementations, when the threshold number of pixels does not include the virtual content, the operation is rejected (e.g., not performed).

Figure 8:
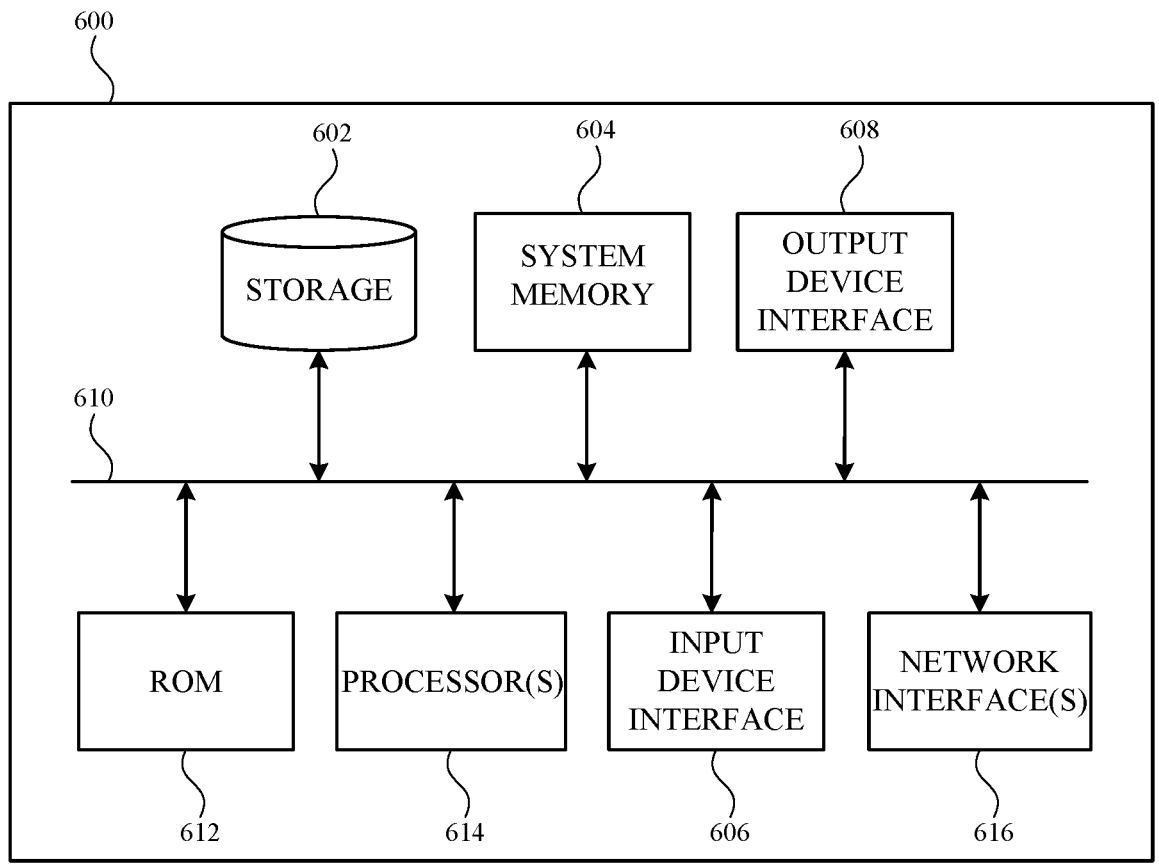
FIG. 8 illustrates an electronic system with which one or more implementations of the subject technology may be implemented.

FIG. 8 illustrates an electronic system 600 with which one or more implementations of the subject technology may be implemented. The electronic system 600 can be, and/or can be a part of, the electronic device 105 as shown in FIG. 1. The electronic system 600 may include various types of computer readable media and interfaces for various other types of computer readable media. The electronic system 600 includes a bus 610, one or more processing units 614, a system memory 604 (and/or buffer), a ROM 612, a permanent storage device 602, an input device interface 606, an output device interface 608, and one or more network interfaces 616, or subsets and variations thereof.

The bus 610 collectively represents all system, peripheral, and chipset buses that communicatively connect the numerous internal devices of the electronic system 600. In one or more implementations, the bus 610 communicatively connects the one or more processing units 614 with the ROM 612, the system memory 604, and the permanent storage device 602. From these various memory units, the one or more processing units 614 retrieves instructions to execute and data to process in order to execute the processes of the subject disclosure. The one or more processing units 614 can be a single processor or a multi-core processor in different implementations.

The ROM 612 stores static data and instructions that are needed by the one or more processing units 614 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing units 614 may need at runtime. In one or more implementations, the processes of the subject disclosure are stored in the system memory 604, the permanent storage device 602, and/or the ROM 612 (which are each implemented as a non-transitory computer-readable medium). From these various memory units, the one or more processing units 614 retrieves instructions to execute and data to process in order to execute the processes of one or more implementations.

The bus 610 also connects to the input device interface 606 and output device interface 608. The input device interface 606 enables a user to communicate information and select commands to the electronic system 600. Input devices that may be used with the input device interface 606 may include, for example, alphanumeric keyboards and pointing devices (also called "cursor control devices"). The input device interface 606 may enable, for example, the display of images generated by electronic system 600. Output devices that may be used with the input device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 610 also couples the electronic system 600 to one or more networks and/or to one or more network nodes, such as the electronic device 105 shown in FIG. 1, through the one or more network interfaces 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, and/or any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

As described above, one aspect of the present technology is the gathering and use of data available from specific and legitimate sources for providing content that may cause a user to experience double vision when viewing the content. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing content on an MR device.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the forgoing, the present disclosure also contemplates embodiments in which users selectively block the use of, or access to, personal information data. That is, the present disclosure contemplates that hardware and/or software elements can be provided to prevent or block access to such personal information data. For example, in the case of presenting or generating virtual content on an MR device, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other forgoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    identifying virtual content to be presented by an electronic device;
    sampling a pixel and a plurality of pixels proximate to the pixel, wherein the pixel includes at least a portion of the virtual content;
    determining whether the pixel and the plurality of pixels comprise a threshold amount of the virtual content; and in response to a determination that the pixel and the plurality of pixels comprise an amount that is above the threshold amount of the virtual content, performing a blur operation on at least the pixel.

2. The method of claim 1, further comprising performing the blur operation on the plurality of pixels.

3. The method of claim 1, wherein sampling the pixel and the plurality of pixels comprises obtaining the pixel within a predetermined distance from a gaze region of a user of the electronic device.

4. The method of claim 3, further comprising:
obtaining, from one or more sensors of the electronic device, gaze tracking information; and
determining, based at least in part on the gaze tracking information, the gaze region.

5. The method of claim 1, wherein sampling the pixel and the plurality of pixels proximate to the pixel comprises sampling the plurality of pixels within a predetermined distance from the pixel.

6. The method of claim 1, further comprising in response to the pixel and the plurality of pixels not comprising the threshold amount of the virtual content, forgo performing the blur operation.

7. The method of claim 1, wherein performing the blur operation comprises:
obtaining respective colors of the pixel and the plurality of pixels;
determining, from the respective colors, a representative color; and
transforming the pixel and the plurality of pixels to substantially comprise the representative color.

8. The method of claim 1, wherein the blur operation comprises a Gaussian blur.

9. A non-transitory computer-readable medium, comprising:
computer-readable instructions that, when executed by a processor, cause the processor to perform one or more operations comprising:
providing virtual content in conjunction with one or more real world objects;
determining, based on a gaze of a user, that the virtual content is not within a field of view of the user;
sampling a plurality of pixels, wherein at least one pixel from the plurality of pixels comprises a portion of the virtual content;
determining a number of the sampled plurality of pixels that comprise the virtual content; and
in response to the number being at or above a threshold number of pixels, performing an operation on the plurality of pixels.

10. The non-transitory computer-readable medium of claim 9, wherein performing the operation comprises performing a blur operation on the plurality of pixels.

11. The non-transitory computer-readable medium of claim 9, wherein sampling the plurality of pixels comprises:
selecting the at least one pixel; and
selecting pixels within a predetermined distance of the at least one pixel.

12. The non-transitory computer-readable medium of claim 11, wherein the predetermined distance is based on a radius extending from the at least one pixel.

13. The non-transitory computer-readable medium of claim 9, wherein determining the virtual content is not within the field of view comprises:
obtaining, from one or more sensors, gaze tracking information; and
determining, based at least in part on the gaze tracking information, the gaze.

14. The non-transitory computer-readable medium of claim 9, wherein the one or more operations further comprise performing the operation on a first image of the virtual content and on a second image of the virtual content.

15. The non-transitory computer-readable medium of claim 9, wherein the one or more operations further comprise in response to the number being below the threshold number of pixels, forgo performing the operation on the plurality of pixels.

16. The non-transitory computer-readable medium of claim 9, wherein performing the operation comprises:
obtaining respective colors of the plurality of pixels;
determining, from the respective colors, a representative color; and
transforming the plurality of pixels to substantially comprise the representative color.

17. A system, comprising:
a memory; and
a processor configured to:
sample a pixel from virtual content being provided for projection onto a lens of a see-through display;
sample a plurality of pixels within a predetermined distance from the pixel;
determine whether a total number of the pixel and the plurality of pixels exceeds a threshold number of pixels comprising the virtual content; and
in response to the total number of the pixel and the plurality of pixels exceeding the threshold number, perform an operation to blur the virtual content.

18. The system of claim 17, wherein the processor is further configured to determine, based on gaze tracking information, whether the virtual content is within a field of view.

19. The system of claim 17, wherein the processor is further configured to sample the pixel that at least partially comprises the virtual content.

20. The system of claim 17, wherein the virtual content is external to a field of view of a user.

* * * * *

UNITED STATES PATENT AND TRADEMARK OFFICE
CERTIFICATE OF CORRECTION

| | | |
|---|---|---|
| PATENT NO. | : 12,346,496 B2 | Page 1 of 1 |
| APPLICATION NO. | : 18/437191 | |
| DATED | : July 1, 2025 | |
| INVENTOR(S) | : Nahckjoon Kim et al. | |

It is certified that error appears in the above-identified patent and that said Letters Patent is hereby corrected as shown below:

In the Specification

Column 6, Line 61: Replace: "that that", with: --that--.

Signed and Sealed this
Twenty-first Day of October, 2025

John A. Squires
*Director of the United States Patent and Trademark Office*